(12) United States Patent
Lin et al.

(10) Patent No.: US 8,534,894 B2
(45) Date of Patent: Sep. 17, 2013

(54) LIGHT GUIDE PLATE, BACKLIGHT MODULE AND METHOD OF GUIDING LIGHT

(75) Inventors: Yu-Jeng Lin, Taoyuan (TW); Guan-Kai Ciou, Taoyuan (TW); Shin-Kun Lee, Taoyuan (TW)

(73) Assignee: Global Lighting Technology Inc., Taoyuan (TW)

( * ) Notice: Subject to any disclaimer, the term of this patent is extended or adjusted under 35 U.S.C. 154(b) by 382 days.

(21) Appl. No.: 12/969,584

(22) Filed: Dec. 15, 2010

(65) Prior Publication Data

US 2011/0149595 A1 Jun. 23, 2011

(30) Foreign Application Priority Data

Dec. 23, 2009 (TW) .............................. 98144535 A
Jul. 26, 2010 (TW) .............................. 99124556 A

(51) Int. Cl.
*F21V 7/04* (2006.01)
(52) U.S. Cl.
USPC ............................ 362/606; 362/615; 362/612

(58) Field of Classification Search
USPC ........................................ 362/606, 615, 612
See application file for complete search history.

(56) References Cited

U.S. PATENT DOCUMENTS

| 8,272,770 | B2 * | 9/2012 | Richardson | 362/605 |
| 2006/0002148 | A1 * | 1/2006 | Kim et al. | 362/615 |
| 2007/0189036 | A1 * | 8/2007 | Chen et al. | 362/613 |
| 2011/0310635 | A1 * | 12/2011 | Hsiung | 362/615 |

* cited by examiner

*Primary Examiner* — Evan Dzierzynski
(74) *Attorney, Agent, or Firm* — CKC & Partners Co., Ltd.

(57) ABSTRACT

A light guide plate, backlight module installed with the same and method of guiding light utilizing the same are provided. The light guide plate has a bottom surface, a light outlet surface opposite to the bottom surface, and a light inlet surface at least connected with the light outlet surface. A light is introduced to the light inlet surface and transmitted in the light guide plate. The light guide plate comprises a light transmissive substrate installed with at least one through hole, and a first slot installed on the light transmissive substrate and arranged at the periphery of the through hole.

20 Claims, 13 Drawing Sheets

LIGHT GUIDE PLATE, BACKLIGHT MODULE AND METHOD OF GUIDING LIGHT

RELATED APPLICATIONS

This application claims priorities to Taiwan Application Serial Number 098144535, filed Dec. 23, 2009, and Taiwan Application Serial Number 099124556, filed Jul. 26, 2010, which are herein incorporated by reference.

BACKGROUND

1. Technical Field

The present invention relates to a light guide plate, especially to a light guide plate (LGP) with high light utilization rate.

2. Description of Related Art

A light guide plate is often used in a backlight module of side-view type liquid crystal display or illumination equipment. In recent years, the light guide plate is further utilized in various electronic devices for guiding the designed colors or light to the appearance of the electronic device.

FIG. 1 is a schematic perspective view showing a conventional light guide plate. In FIG. 1, a first direction D1 and a second direction D2 are indicated, wherein the first direction D1 is defined at the rear (or bottom) of a light guide plate 100, the second direction D2 is defined at the front (or top) of the light guide plate 100. Referring to FIG. 1, the light guide plate 100 is installed with through holes 110 corresponding to components of an electronic device (not shown), such that the light guide plate 100 can be installed on the electronic device (not shown). However, the through holes 110 would shield light L transmitting in the light guide plate 100, therefore dark segments are formed at the rears of the through holes 110.

FIG. 2 is a schematic view showing another conventional light guide plate. For solving the problem of dark segments on the light guide plate 100 in FIG. 1, as shown in FIG. 2, another light guide plate 100a is provided. On the light guide plate 100a, through holes 122 or larger spaces (e.g. triangle or rectangle openings) are further installed or formed at the top right ends of the through holes 110. As such, the light L in the light guide plate 100 is refracted by the through holes 122 and transmitted to the rears of the through holes 110, so a brightening effect is generated at the peripheries of the through holes 110 for eliminating the dark segments. However, the light guide plate 100a still has a disadvantage which is that the light L would be outputted to the exterior of the light guide plate 100a from the through holes 122, a loss of the light L is occurred.

SUMMARY

In view of the mentioned disadvantages, the present invention provides a light guide plate having high light utilization rate.

The present invention provides a backlight module in which the mentioned light guide plate is installed for providing a unified planar light source.

The present invention provides a method of guiding light, capable of solving the problem of dark segments generated due to through holes of light guide plate.

As above mentioned, the present invention provides a light guide plate. The light guide plate comprises a bottom surface, a light outlet surface opposite to the bottom surface, and a light inlet surface at least connected to the light outlet surface. A light can be introduced to the light inlet surface and transmitted in the light guide plate. The light guide plate includes a light transmissive substrate and a first slot. The light transmissive substrate has at least one through hole. The first slot is installed on the light transmissive substrate and arranged at the periphery of the through hole.

The present invention further provides a backlight module. The backlight module comprises a light guide plate and a light source. The light guide plate is provided with a bottom surface, a light outlet surface opposite to the bottom surface, and a light inlet surface at least connected to the light outlet surface. The light guide plate includes a light transmissive substrate and a first slot. The light transmissive substrate has at least one through hole. The first slot is installed on the light transmissive substrate and arranged at the periphery of the through hole. The light source is installed at one side of the light inlet surface. The light source provides light to be introduced to the mentioned light inlet surface and transmitted in the light guide plate.

According to one embodiment of the present invention, an inner light guide portion is formed between the first slot and the through hole, a light is refracted in the inner light guide portion, and outputted from the periphery of the through hole towards the directions of the light outlet surface and the bottom surface of the light transmissive substrate.

According to one embodiment of the present invention, a cross sectional shape of the mentioned first slot can be a semi-circular, rectangular, triangular or trapezoid shape.

According to one embodiment of the present invention, the mentioned light guide plate further includes a second slot installed on the light transmissive substrate and arranged along the periphery of the first slot.

According to one embodiment of the present invention, a shape of the mentioned through hole can be shaped as a round, oval, triangular, polygonal or irregular shape.

According to one embodiment of the present invention, the shape of the mentioned first slot is the same as the shape of the mentioned through hole; or, the shape of the mentioned first slot can be different from the shape of the mentioned through hole.

According to one embodiment of the present invention, the mentioned first slot is installed on the bottom surface or the light outlet surface of the light guide plate.

According to one embodiment of the present invention, the mentioned backlight module further includes a reflection sheet installed at the bottom surface of the light guide plate.

According to one embodiment of the present invention, the mentioned light source includes a light emitting diode array.

The present invention further provides a method of guiding light including steps as follows. Firstly, a light guide plate is provided, the light guide plate has at least one through hole. A first slot is arranged at the periphery of the through hole, such that an inner light guide portion is formed between the first slot and the through hole, wherein light introduced and transmitted in the light guide plate is refracted in the inner light guide portion, and outputted from the periphery of the through hole towards at least one of two opposite surfaces of the light guide plate.

According to one embodiment of the present invention, the mentioned method of guiding light can be processed as follow. The light transmitted in the light guide plate passes through the first slot via a non-break portion of the light guide plate positioned under the first slot, then enters the inner light guide portion for being refracted, and is outputted from the periphery of the through hole towards at least one of two opposite surfaces of the light guide plate.

According to one embodiment of the present invention, the mentioned method of guiding light can be processed as follow. The light transmitted in the light guide plate is outputted from the light guide plate then enters the first slot, then the light enters the inner light guide portion from the first slot for being refracted, and is outputted from the periphery of the through hole towards at least one of two opposite surfaces of the light guide plate.

According to one embodiment of the present invention, the mentioned method of guiding light can be processed as follow. A reflection sheet is further provided and installed at one side of the light guide plate, wherein a light transmitted in the light guide plate is outputted from the light guide plate and is transmitted towards the reflection sheet, the light reflected by the reflection sheet then enters the inner light guide portion for being refracted, so as to be outputted from the periphery of the though hole towards at least one of two opposite surfaces of the light guide plate.

The present invention installs a first slot at the periphery of through hole on the light guide plate, so an inner light guide portion can be defined between the through hole and the first slot. As such, before the light passes through the through hole, the light is transmitted to the rear of the through hole without the need of installing additional through holes, so the problem of dark segment generated at the rear of the through hole is solved and the light utilization rate is increased

BRIEF DESCRIPTION OF THE DRAWINGS

The present invention will be apparent to those skilled in the art by reading the following detailed description of a preferred embodiment thereof, with reference to the attached drawings, in which.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The light guide plate with high light utilization rate provided by the present invention is capable of solving the problem of dark segments generated due to through holes. Hereinafter several embodiments are provided for illustrating features of the light guide plate according to the present invention. Moreover, a first direction D1 and a second direction D2 are indicated in the figures, wherein the first direction D1 is defined as the rear (or bottom) side of the light guide plate, the second direction D2 is defined as the front (or top) side of the light guide plate. Light transmitted in the light guide plate is generally outputted towards to front (i.e. the second direction D2) of the light guide plate.

Figure 1:
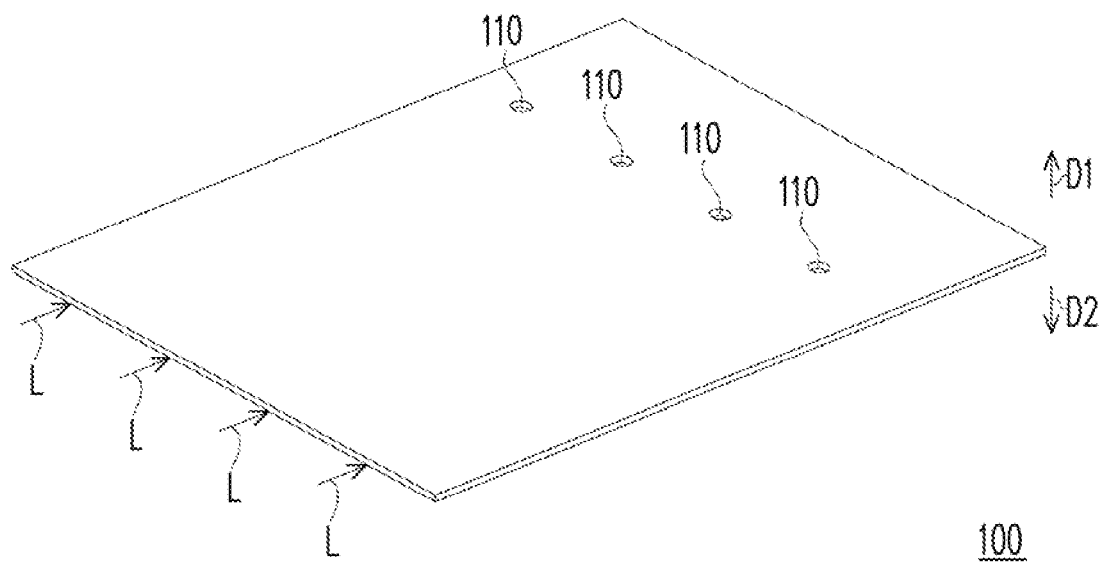
FIG. 1 is a schematic perspective view showing a conventional light guide plate.
Figure 2:
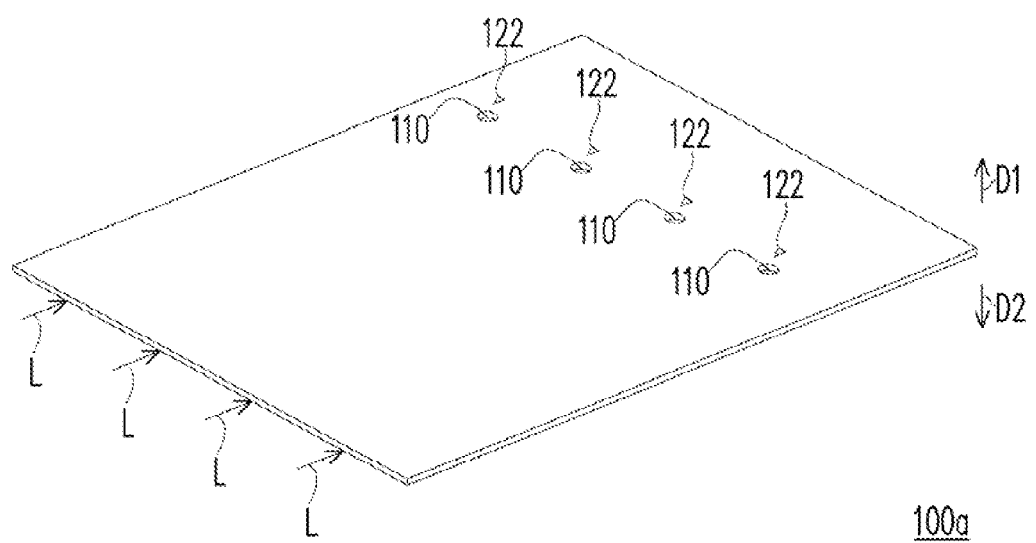
FIG. 2 is a schematic view showing another conventional light guide plate.
Figure 3:
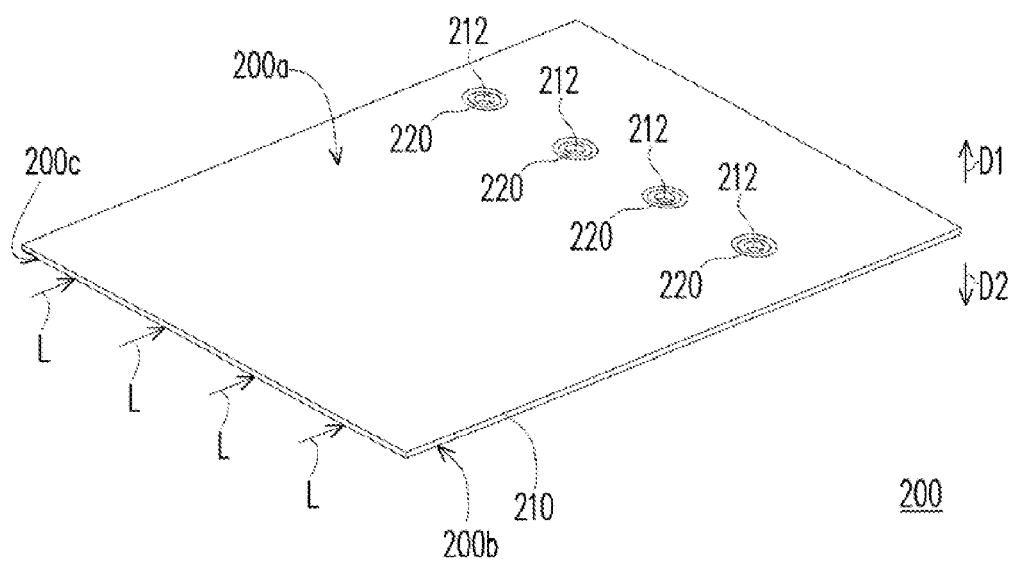
FIG. 3 is a schematic perspective view showing a light guide plate according to one preferred embodiment of the present invention.

FIG. 3 is a schematic perspective view showing a light guide plate according to one preferred embodiment of the present invention. Referring to FIG. 3, the light guide plate 200 has a bottom surface 200a, a light outlet surface 200b opposite to the bottom surface 200a, and a light inlet surface 200c connected with the bottom surface 200a and the light outlet surface 200b. Light L is introduced into the light guide plate 200 from the light inlet surface 200c and transmitted in the light guide plate 200. In FIG. 3, the left surface is defined as the light inlet surface 200c which is only served as an illustration; in actual practice, other three surfaces connected with the bottom surface 200a and the light outlet surface 200b can also be served as the light inlet surface 200c. However, the light inlet surface according to the present invention is not limited to the above mentioned, the light inlet surface can also be defined at an inner wall of an opening of the light guide plate.

Referring to FIG. 3, the light guide plate 200 includes a light transmissive substrate 210 and first slots 220. The light transmissive substrate 210 has at least one through hole 212 (four through holes are shown in FIG. 3). Each of the first slots 220 is installed on the light transmissive substrate 210 and respectively arranged at the peripheries of the through holes 212. Because the first slots 212 is installed to surround the periphery of the through hole 212, the light L can be transmitted to the rear of the through hole 212 before passing through the through hole 212, such that a neighbor area of the through hole 212 is brightened so as to solve the problem of dark segment.

Figure 4:
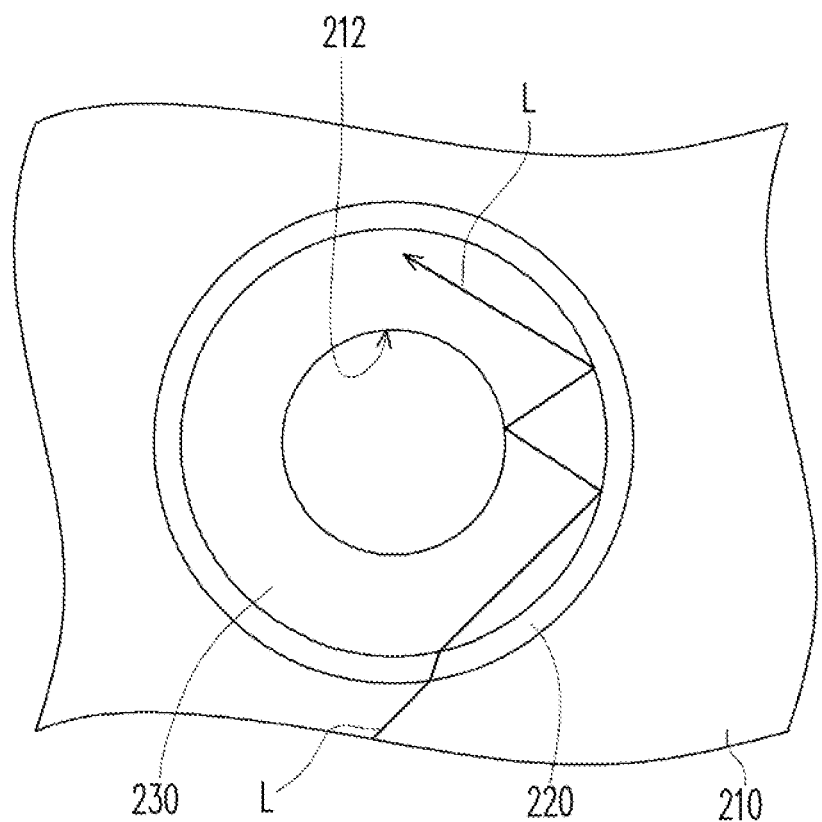
FIG. 4 is a schematic enlarged view showing the through hole and the first slot of FIG. 3.

FIG. 4 is a schematic enlarged view showing the through hole and the first slot of FIG. 3. In FIG. 4, a direction outwardly extended from the paper surface is defined as the first direction D1, a direction inwardly extended into the paper surface defined as the second direction D2. The function of the first slot is illustrated in FIG. 3 and FIG. 4, in other words an inner light guide part 230 is formed between the first slot 220 and the through hole 212; the light L is refracted in the inner light guide part 230 and outputted from the light outlet surface defined at the periphery of the through hole 212 of the light transmissive substrate 210. In other words, the light L is outputted towards the first direction D1 and the second direction D2.

In particular, the first slot 220 installed at the periphery of the through hole 212 defines the inner light guide part 230 on the light guide plate 210. The first slot 220 is filled with air as a media. As shown in FIG. 4, the light L transmitted in the light guide plate 210 is capable of entering the first slot 220 before entering the through hole 212. Then the light L is inputted from the first slot 220 to the inner light guide part 230. So the light L is repeatedly reflected and refracted in the inner light guide part 230 then eventually outputted from the periphery of the through hole 212 towards the directions of the light outlet surface 200b and the bottom surface 200a of the light transmissive substrate 210. Moreover, as shown in FIG. 3 and FIG. 4, the first slots 220 can be formed on the bottom surface 200a of the light guide plate 210. Moreover, the first slots 220 can be formed on the light outlet surface 200b of the light guide plate 210.

In the embodiment according to FIG. 3 and FIG. 4, the shape of the through hole 212 is in a round shape, as an example. However, in other embodiments, the shape of the through hole 212 can be in oval, triangular, polygonal or irregular shape. The shape of the through hole 212 is not limited according to the present invention. Moreover, the shape of the first slot 220 can be corresponding to the shape of the through hole 212. In one embodiment, the shape of the first slot 220 is the same as the shape of the through hole 212, or the shape of the first slot 220 is different from the shape of the through hole 212.

Figure 5:
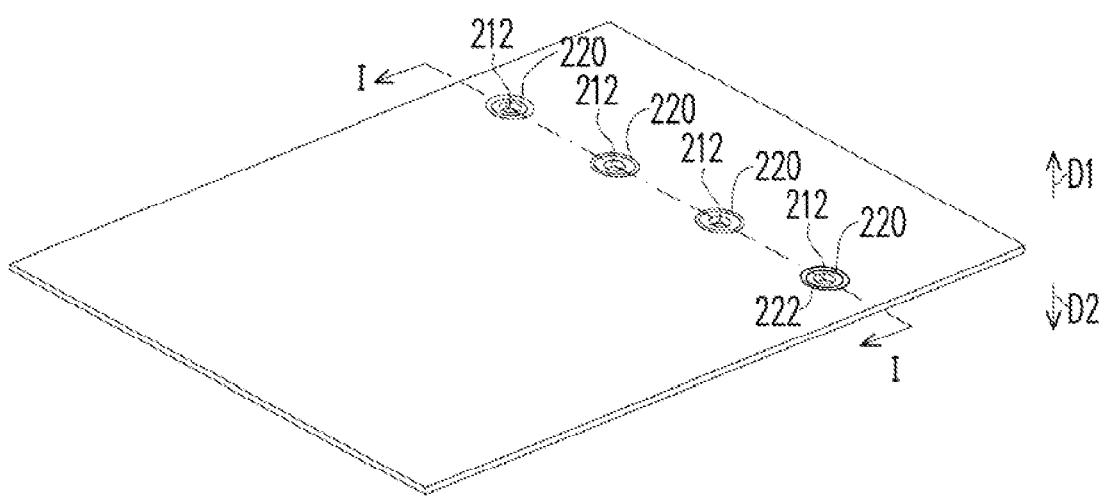
FIG. 5 is a schematic perspective view showing four different arrangements of through holes and first slots according to one preferred embodiment of the present invention.

FIG. 5 is a schematic perspective view showing four different arrangements of through holes and first slots according to one preferred embodiment of the present invention. FIG. 6A to FIG. 6D are cross sectional views taken along line I-I of FIG. 5. The four different arrangements of through holes and first slots shown from the upper left side to the bottom right side of FIG. 5 are respectively corresponding to FIG. 6A to FIG. 6D. What shall be addressed is that the round shape of the through hole 212 is serving for illustration. As above mentioned, the shape of the through hole 212 can be varied, and the shape of the first slot 220 can be altered with respect to the through hole 212.

Figure 6A:
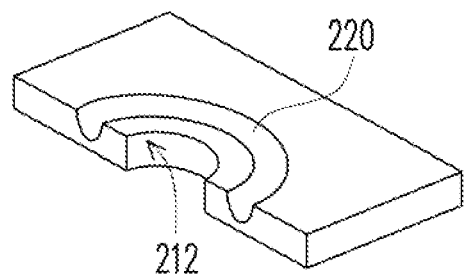
FIG. 6A to FIG. 6D are cross sectional views taken along line I-I of FIG. 5.

As shown in FIG. 5 and FIG. 6A, the first arrangement of through hole 212 and first slot 220 is that: the through hole 212 is in a round shape, and the cross sectional shape of the first slot 220 is in a semi-circular shape.

Figure 6B:
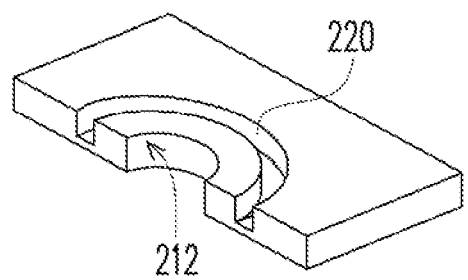
Figure 6C:
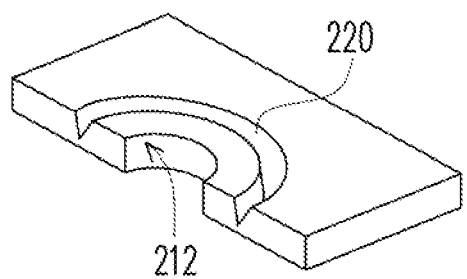

As shown in FIG. 5 and FIG. 6B, the second arrangement of through hole 212 and first slot 220 is that: the through hole 212 is in a round shape, and the cross sectional shape of the first slot 220 is in a rectangular shape. As shown in FIG. 5 and FIG. 6C, the third arrangement of through hole 212 and first slot 220 is that: the through hole 212 is in a round shape, and the cross sectional shape of the first slot 220 is in a triangular shape.

Figure 6D:
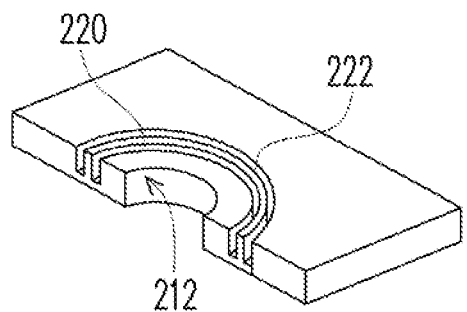

As shown in FIG. 5 and FIG. 6D, in this embodiment, the light guide plate 200 can further include a second slot 222 installed on the light transmissive substrate 210 and arranged at the periphery of the first slot 220. The fourth arrangement of through hole 212, first slot 220 and second slot 222 is that: the through hole 212 is in a round shape, and the cross sectional shapes of the first slot 200 and the second slot 222 are in rectangular shapes.

The mentioned FIG. 5 and FIG. 6A to FIG. 6D are served as illustrations. In actual practice, the shape of the through hole 212 (round, oval, triangular, polygonal or irregular shape), the cross sectional shape of the first slot 220 (semi-circular, rectangular, triangular or trapezoid shape), the quantity of the first slots 220, or whether additionally installing the second slots 222 can be changed with respect to the design and actual needs.

In other words, as shown in FIG. 3, on a light guide plate 200, only one arrangement of through hole 212 and first slot 220 is adopted; or as shown in FIG. 5, on a light guide plate 200, plural arrangements of through hole 212 and first slot 220 (the second slot 222) can be adopted. According to the present invention, the shape, the cross sectional shape, the quantity and the arrangement of the though hole 212, the first slot 220 and the second slot 222 are not limited.

Figure 7A:
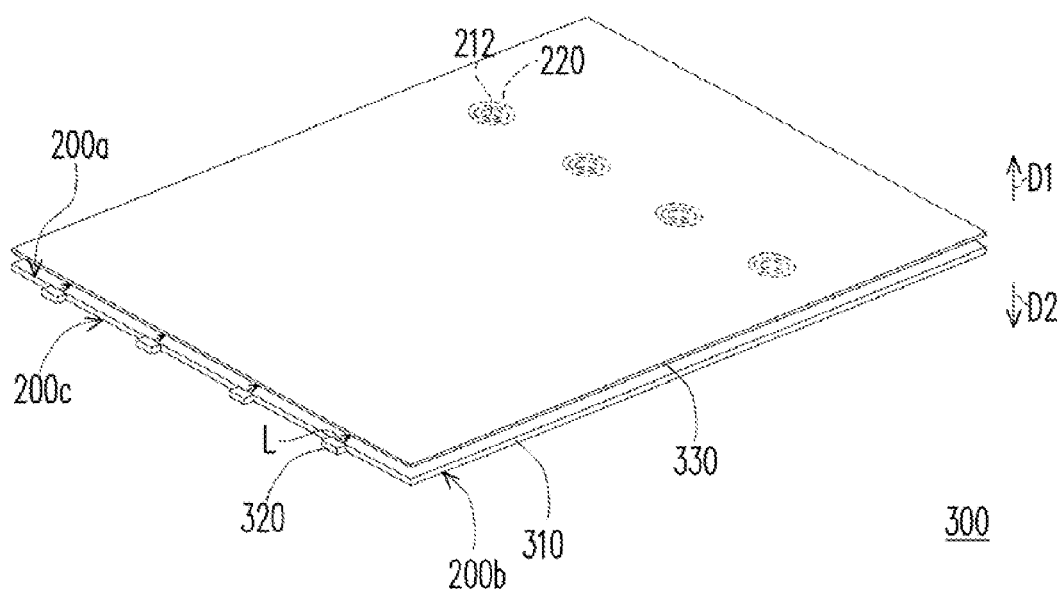
FIG. 7A is a schematic view showing a backlight module according to one embodiment of the present invention.

FIG. 7A is a schematic view showing a backlight module according to one preferred embodiment of the present invention. Referring to FIG. 7A, the backlight module 300 includes a light guide plate 310 and a light source 320. The light guide plate 310 can adopt the light guide plate 200 as shown from FIG. 3 to FIG. 6, and the same components are provided with the same numeral references. What shall be noted is that the light guide plate 310 has a plurality of through holes 212, and the periphery of each through hole 212 is installed with a first slot 220. The light source 320 is installed at one side of the light inlet surface 200c. The light source 320 provides light L to be introduced into the light inlet surface 200c and transmitted in the light guide plate 310.

However, according to the present invention, the arrangement of light inlet surface and light source is not limited to what is disclosed above.

Figure 7B:
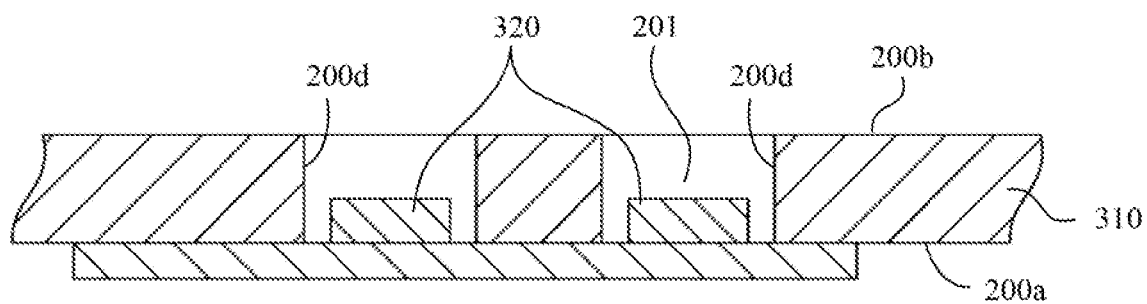
FIG. 7B is a cross sectional view showing a backlight module according to another embodiment of the present invention.

FIG. 7B is a cross sectional view showing a backlight module according to another embodiment of the present invention. In this embodiment, an opening 201 is concavely installed on the light outlet surface 200b of the light guide plate 310, the light inlet surface 200d is defined as inner walls of the opening 201 of the light guide plate 310. The light source 320 can also be arranged in the opening 201 of the light guide plate 310, for providing light L to be introduced into the light inlet surface 200d and transmitted in the light guide plate 310.

The mentioned opening 201 can completely penetrate the light guide plate 310, light emitting components (such as light emitting diodes) of the light source 320 are extended into the opening 201 from the bottom surface 200a. The light source 320 installed at the opening 201 can provide light L to be introduced into the light inlet surface 200d and transmitted in the light guide plate 310.

Figure 7C:
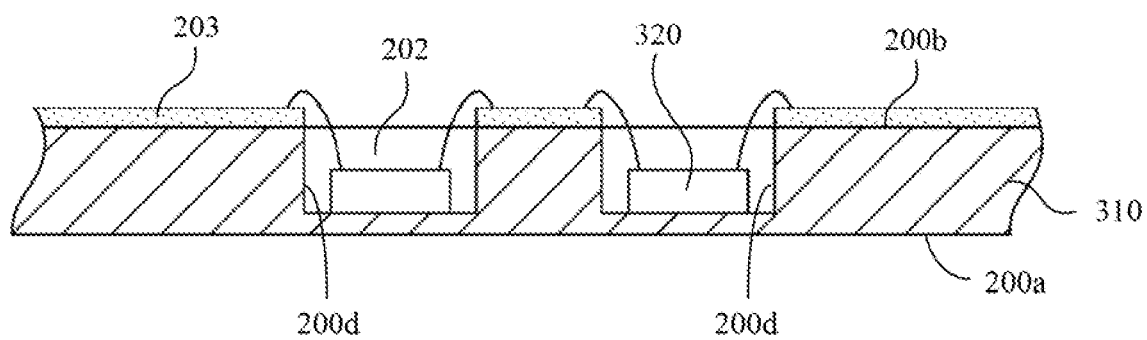
FIG. 7C is a cross sectional view showing a backlight module according to still one another embodiment of the present invention.

FIG. 7C is a cross sectional view showing a backlight module according to still one another embodiment of the present invention. The mentioned opening 202 does not completely penetrate through the light guide plate 310 for receiving at least one of the light emitting components (such as light emitting diodes) of the light source 320 from the light outlet surface 200b, the light emitting components are electrically connected to a silver adhesive circuit 203 installed on the light outlet surface 200b for receiving power and signals. The light source 320 installed in the opening 202 can provide light L to be introduced into the light inlet surface 200d and transmitted in the light guide plate 310.

Referring to FIG. 7A, the backlight module 300 can further include a reflection sheet 330 installed at the bottom surface 200a of the light guide plate 310. As such, the light L emitted from the through holes 212, and the light L repeatedly reflected and refracted in the inner light guide parts 230 (FIG. 4) then emitted from the bottom direction of the through holes 212 can both be reflected by the reflection sheet 330 so as to be outputted from the light outlet surface 200b of the light guide plate 200. Moreover, the mentioned light source 320 can adopt a light emitting diode array or other suitable light sources, the type of the light sources 320 is not limited according to the present invention.

The mentioned light guide plate 200 and the backlight module 300 can be applied in various electronic devices and illumination equipments in which holes, apertures, irregular spaces or through holes being installed on its mechanical structures and light is needed to be guided by a light guide plate, such as a keyboard, computer housing or display can all adopt the light guide plate 200 provided by the present invention.

Take a keyboard as an example for illustrating the application of the light guide plate 210. The keyboard (not shown)

has plural keys (not shown). The light guide plate 210 having plural through holes 212 is installed at the bottom of the keys, such that the keys are corresponding to the through holes 212. As such, designs of colors and lighting can be applied on the keyboard, so the appearance of the keyboard is more attractive; moreover, the first slots 220 are installed at the peripheries of the through holes 212 for eliminating dark segments generated at the rears of the through holes 212.

Figure 8:
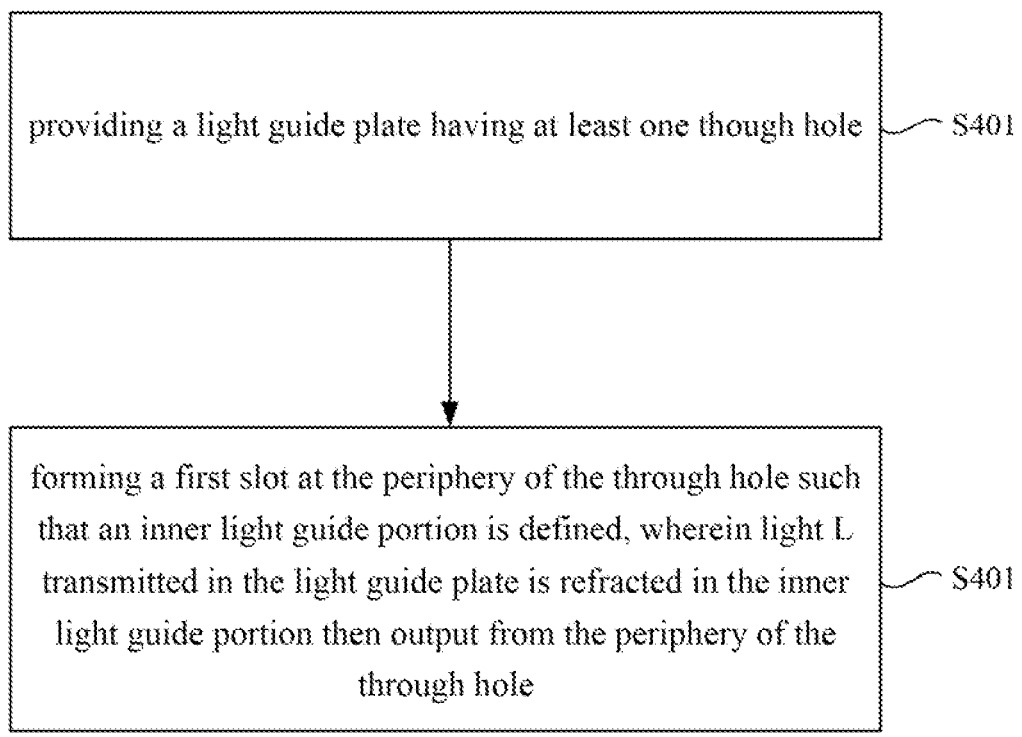
FIG. 8 is a flowchart showing a method of guiding light according to one preferred embodiment of the present invention.

FIG. 8 is a flowchart showing a method of guiding light according to one preferred embodiment of the present invention. Referring to FIG. 3 and FIG. 8, the method of guiding light according to the present invention includes the following steps:

STEP 401: providing a light guide plate 200 having at least one though hole 212;

Next, STEP 402: installing a first slot 220 at the periphery of the through hole 212 such that an inner light guide part 230 is defined, wherein light L transmitted in the light guide plate 200 is refracted in the inner light guide part 230 then outputted from the periphery of the through hole 212.

Figure 9:
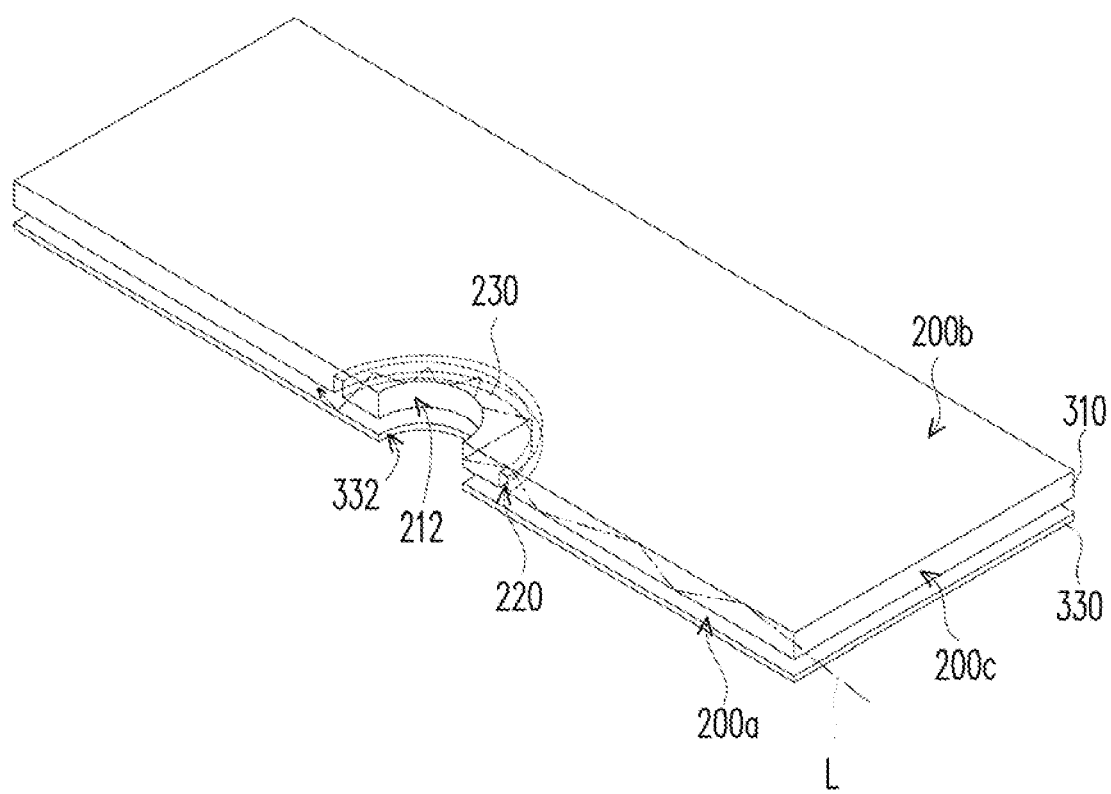
FIG. 9 to FIG. 11 are schematic perspective views showing different ways of guiding and transmitting light in the backlight module of FIG. 7A.
Figure 10:
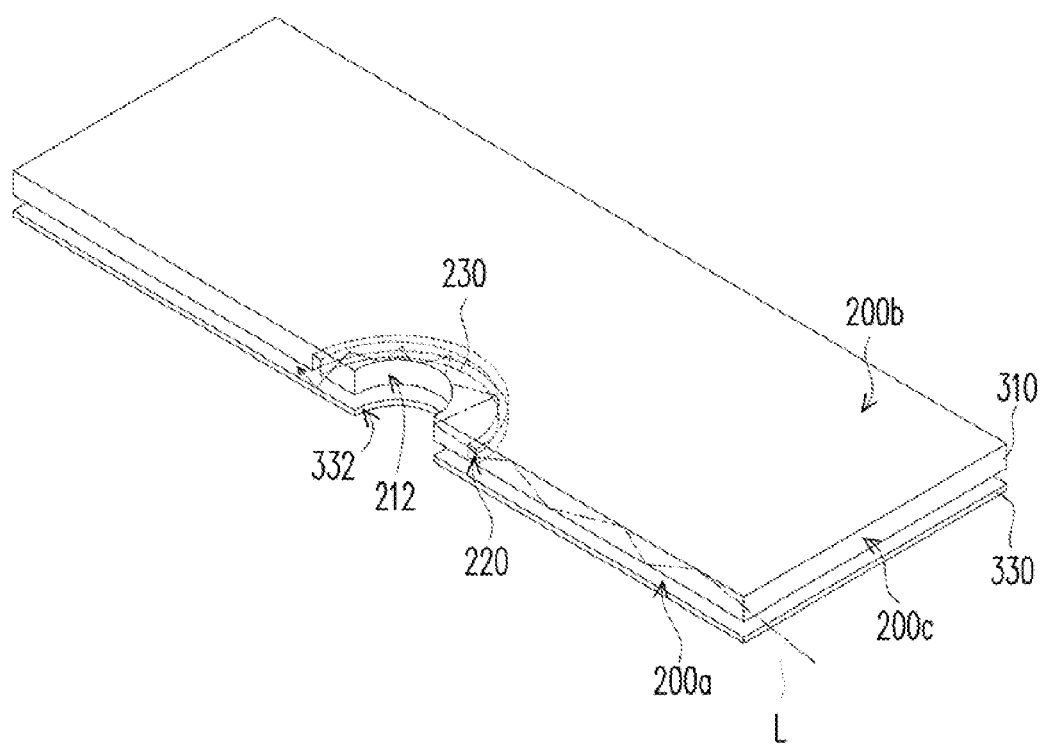
Figure 11:
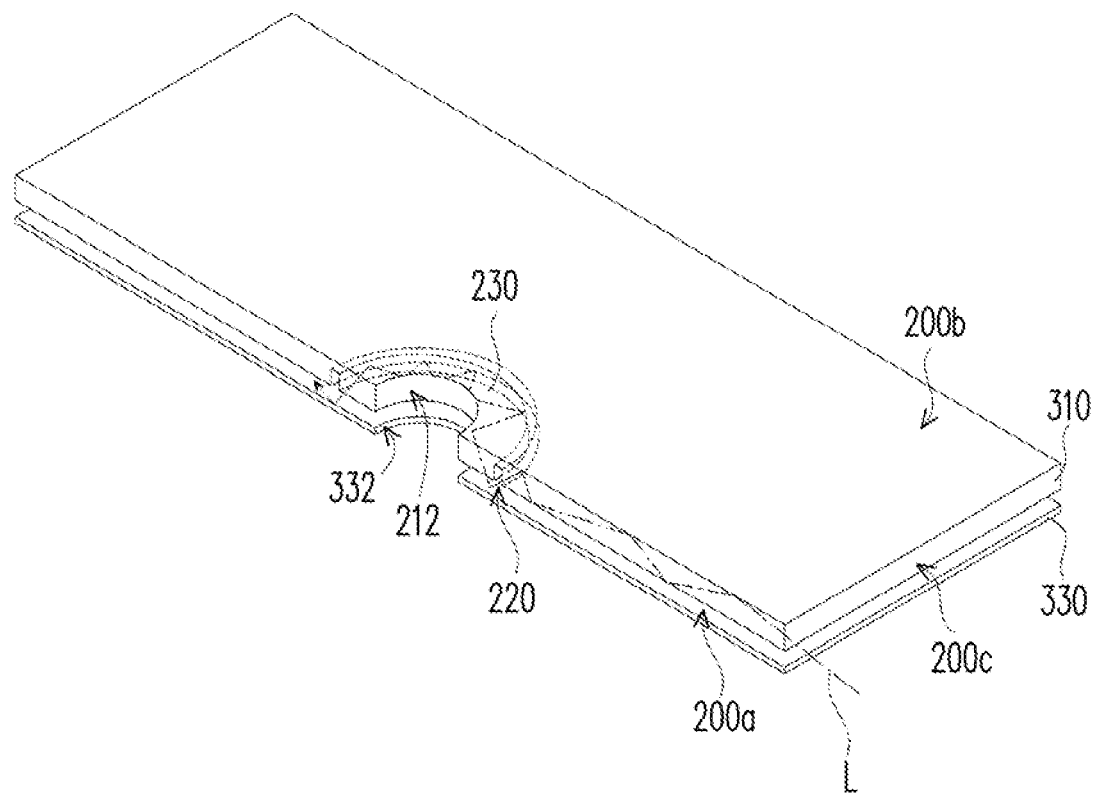

FIG. 9 to FIG. 11 are schematic perspective views showing different ways of guiding and transmitting light in the backlight module of FIG. 7A. Referring to FIG. 9 firstly, light L introduced from the light inlet surface 200c of the light guide plate 310 is completely reflected to transmit in the light guide plate 310. The light L passes through the first slot 220 via a non-cut portion of the light guide plate 310 positioned under the first slot 220, then enters the inner light guide part 230. The light L entered the inner light guide part 230 is continuously reflected and refracted so as to reach the rear of the through hole 212. Then the light L is outputted from the periphery of the through hole 212 towards at least one of two opposite surfaces of the light guide plate 310, i.e. being outputted from the bottom surface 200a of the light guide plate 310, the light outlet surface 200b of the light guide plate 310, or the bottom surface 200a and the light outlet surface 200b of the light guide plate 310.

Referring to FIG. 10, light L introduced from the light inlet surface 200c of the light guide plate 310 is completely reflected to transmit in the light guide plate 310. The light L is outputted from the light guide plate 310 and enters the first slot 220, and then enters the inner light guide part 230 from the first slot 220. The light L entered the inner light guide part 230 is continuously reflected and refracted so as to reach the rear of the through hole 212. Then the light L is outputted from the periphery of the through hole 212 towards at least one of two opposite surfaces of the light guide plate 310, i.e. being outputted from the bottom surface 200a of the light guide plate 310, the light outlet surface 200b of the light guide plate 310, or the bottom surface 200a and the light outlet surface 200b of the light guide plate 310.

Referring to FIG. 11, light L introduced from the light inlet surface 200c of the light guide plate 310 is completely reflected to transmit in the light guide plate 310. The light L is outputted from the first slot 220 and transmitted towards the reflection sheet 330. The light L reflected by the reflection sheet 300 enters the inner light guide part 230. The light L entered the inner light guide part 230 is continuously reflected and refracted so as to reach the rear of the through hole 212. Then the light L is outputted from the periphery of the through hole 212 towards at least one of two opposite surfaces of the light guide plate 310, i.e. being outputted from the bottom surface 200a of the light guide plate 310, the light outlet surface 200b of the light guide plate 310, or the bottom surface 200a and the light outlet surface 200b of the light guide plate 310.

Moreover, as shown from FIG. 9 to FIG. 11, the reflection sheet 330 can also be provided with through holes 332 for assisting the installation of electronic device (not shown). However, whether the reflection sheet 330 being installed with the through holes 332 is according to the design, which is not limited according to the present invention.

As mentioned above, the light guide plate, the backlight module and the method of guiding light according to the present invention at least have following advantages: light is transmitted in the light guide plate through reflection and refraction, so when the light encounters a through hole with any shape, the light would inevitably decay to a certain level, so a dark segment is generated at the rear of the through hole, however, the present invention utilizes a first slot to be installed at the periphery of the through hole for forming an inner light guide part; before the light passes through the through hole, the mentioned design can transfer the light to the rear of the through hole or output the light from the periphery of the through hole towards at least one of two opposite surfaces of the light guide plate, as such, the problem of dark segment is solved and the light utilization rate is increased.

Although the present invention has been described with reference to the preferred embodiments thereof, it is apparent to those skilled in the art that a variety of modifications and changes may be made without departing from the scope of the present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A light guide plate having a bottom surface, a light outlet surface opposite to the bottom surface, and a light inlet surface at least connected with the light outlet surface, and light is introduced to the light inlet surface and transmitted in the light guide plate, the light guide plate comprising:
   a light transmissive substrate installed with at least one through hole; and
   a first slot installed on the light transmissive substrate and arranged at the periphery of the through hole.

2. The light guide plate according to claim 1, wherein an inner light guide portion is formed between the first slot and the through hole, the light is refracted in the inner light guide portion, and outputted from the periphery of the through hole towards the directions of the light outlet surface and the bottom surface of the light transmissive substrate.

3. The light guide plate according to claim 1 wherein a cross sectional shape of the first slot is shaped as a semicircular, rectangular, triangular or trapezoid shape.

4. The light guide plate according to claim 1 further comprising:
   a second slot installed on the light transmissive substrate and arranged at the periphery of the first slot.

5. The light guide plate according to claim 1, wherein a shape of the through hole is shaped as a round, oval, triangular, polygonal or irregular shape.

6. The light guide plate according to claim 1, wherein the shape of the first slot is the same as or different from the shape of the through hole.

7. The light guide plate according to claim 1, wherein the first slot is installed on the bottom surface or the light outlet surface of the light guide plate.

8. A backlight module, comprises:
   a light guide plate having a bottom surface, a light outlet surface opposite to the bottom surface, and a light inlet surface at least connected with the light outlet surface, the light guide plate comprising:
   a light transmissive substrate having at least one through hole;
   a first slot installed on the light transmissive substrate and arranged at the periphery of the through hole; and
   a light source installed at the light inlet surface, for providing light to be introduced to the light inlet surface and transmitted in the light guide plate.

9. The backlight module according to claim 8, wherein an inner light guide portion is formed between the first slot and the through hole, the light is refracted in the inner light guide portion, and outputted from the periphery of the through hole towards the directions of the light outlet surface and the bottom surface of the light transmissive substrate.

10. The backlight module according to claim 8, wherein a cross sectional shape of the first slot is shaped as a semi-circular, rectangular, triangular or trapezoid shape.

11. The backlight module according to claim 8 further comprising:
   a second slot installed on the light transmissive substrate and arranged at the periphery of the first slot.

12. The backlight module according to claim 8 wherein a shape of the through hole is shaped as a round, oval, triangular, polygonal or irregular shape.

13. The backlight module according to claim 8, wherein the shape of the first slot is the same as or different from the shape of the through hole.

14. The backlight module according to claim 8, wherein the first slot is in ailed on the bottom surface or the light outlet surface of the light guide plate.

15. The backlight module according to claim 8 further comprising:

a reflection sheet installed at the bottom surface of the light guide plate.

16. The backlight module according to claim 8, wherein the light source comprises a light emitting diode array.

17. A method of guiding light, comprises:
   providing a light guide plate having at least one through hole; and
   forming a first slot at the periphery of the though hole, such that an inner light guide portion is formed between the first slot and the through hole,
   wherein a light introduced and transmitted in the light guide plate is refracted in the inner light guide portion, and is outputted from the periphery of the through hole towards at least one of two opposite surfaces of the light guide plate.

18. The method of guiding light according to claim 17, wherein the light transmitted in the light guide plate passes through the first slot via a non-break portion of the light guide plate positioned under the first slot, then enters the inner light guide portion for being refracted, and is outputted from the periphery of the through hole towards at least one of two opposite surfaces of the light guide plate.

19. The method of guiding light according to claim 17, wherein light transmitted in the light guide plate is outputted from the light guide plate then enters the first slot, then the light enters the inner light guide portion from the first slot for being refracted, and is outputted from the periphery of the through hole towards at least one of two opposite surfaces of the light guide plate.

20. The method of guiding light according to claim 17 further comprising:
   providing a reflection sheet installed at one side of the light guide plate, wherein the light transmitted in the light guide plate is outputted from the light guide plate and is transmitted towards the reflection sheet, the light reflected by the reflection sheet then enters the inner light guide portion for being refracted, so as to be outputted from the periphery of the though hole towards at least one of two opposite surfaces of the light guide plate.

* * * * *